Oct. 23, 1928.

A. PRICE 1,688,653

FILM CARRYING STRIP

Filed Aug. 31, 1922

Inventor
Arthur Price
By his Attorneys

Patented Oct. 23, 1928.

1,688,653

UNITED STATES PATENT OFFICE.

ARTHUR PRICE, OF FREEPORT, NEW YORK.

FILM-CARRYING STRIP.

Application filed August 31, 1922, Serial No. 585,415, and in Canada January 31, 1922.

My invention relates to a film carrying strip, and aims to provide a device of this nature which is primarily adapted for association with a film strip of any desirable character, and aims to provide certain improvements over my prior Patent #1,412,216 issued April 11, 1922.

It is an aim of the present invention to provide a commercially practical carrying strip for use in connection with motion picture films, so as to prevent the latter from becoming broken, and also to overcome any possibility of the film running off the feed sprocket of a projecting machine. Thus the present invention is primarily dedicated to being used as an endless member in connection with a film as employed in continuously operating projecting machines without the constant supervision of an operator, but I wish it understood that the present invention is not necessarily limited to such uses.

A further object of my invention resides in the provision of a carrying strip which is preferably associated with the film prior to the latter's having been exposed, so that this carrying strip will serve as a carrying medium for the film during the exposure, developing etc. of the latter.

A still further object of my invention is that of providing a device of the character specified, in which means will be furnished for retaining the film and carrying strip in permanent relationship, regardless of the use to which these elements are subjected.

Another object of my present invention is that of reducing the amount of film stock necessary for a predetermined length of film, so that the additional expenditure incident to the use of the carrying strip will be substantially compensated for by the saving thus effected.

Still another object of this invention is that of suggesting a method of manufacturing the carrying strip and its application to the film, whereby these results may be attained in the simplest and most satisfactory manner.

With these and numerous other objects in mind, the present invention includes essentially a carrying strip carrying a film, together with means associated with the former for permanent attachment to the latter.

Reference is had to the attached sheet of drawings in which one practical embodiment of my invention has been shown, and it will be seen in these drawings that;

Figs. 1, 2, and 3 are face views of the carrying strip and indicate successive steps in the manufacture thereof.

The essence of my invention consists in the use of a film of any desirable material to which a carrying strip is attached, the latter being of material stronger than that of the film and carrying the feed perforations, the carrying strip also presenting means whereby the film is fixedly attached to its body.

Figure 1:
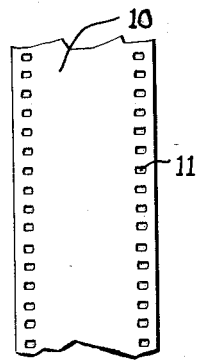

Although I may construct the carrying strip according to a number of different methods I prefer to use the following; primarily I employ a strip of appropriate width, which I prefer to make of hard brass of approximately 38 gauge, it being understood however, that numerous other materials may be employed. This strip is shown in Figure 1, and identified by the reference numeral 10. Adjacent the edges of this strip I perforate the same similar to the manner in which an ordinary film is constructed, and this perforation may be accomplished on a standard machine whose punches (3 or 4 on each side of the assembly) are slightly graduated so that all of the punches do not perforate at precisely the same instant, thereby prolonging the life of the punch, and the perforations thus provided are identified by the reference numeral 11.

Figure 2:
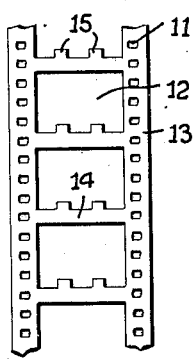

It will be seen, reference being had to Figure 2 that this view shows the second stage in the manufacture of the carrying strip, and it will be noted that apertures 12 have now been suitably formed in the body of the band, which divide the same into side strips 13, and cross bars 14 extend between these side strips, one of the latter being preferably provided for each of the film pictures. Also in removing the material, in order to provide the apertures 12, a certain amount of what might be termed "surplus material" is left in association with each of the bars 14, and this surplus of material extends from these bars in the form of tongues 15.

Figure 3:
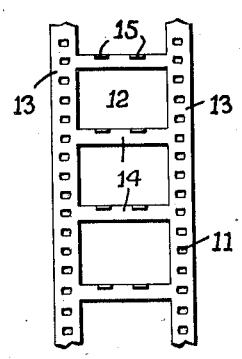
Figure 4:
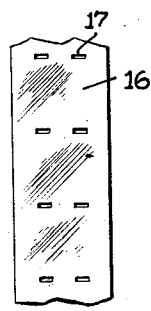
Fig. 4 is a face view of the film prior to its association with the carrying strip.

By a subsequent operation effected by any suitable type of machine, these tongues, as in Figure 3, are bent to extend outwardly at right angles to the body of the strip, and as in Figure 4 I provide a film 16 which may be unexposed, which film has openings 17 through its body at points spaced from each other a distance equal to the spacings of the tongues 15 from one another.

Figure 5:
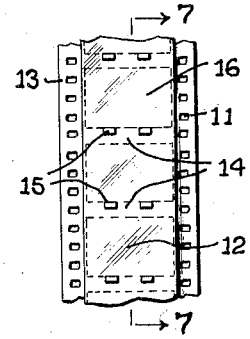
Figs. 5 and 6 are rear and face views respectively of the completed article.
Figure 6:
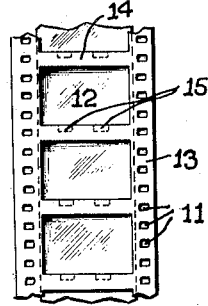
Figure 7:
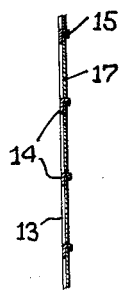
Fig. 7 is a longitudinal sectional view taken along the line 7—7 and in the direction of the arrows indicated in Figure 5, and Figs. 8 and 9 are face and edge views respectively of an optional form of carrying strip which in certain adaptation may be used to advantage.

Thus as in Figure 5, the film may be applied to the strip and the tongues 15 of the latter are brought to extend through the openings 17 of the film body, subsequent to which the tongues are bent to extend parallel to the body of the re-inforcing strip as in Figures 5 to 7, so as to clinch the film and permanently attach it to the said carrying strip. In this connection it is to be noted that I prefer to have a film of a width slightly greater than the distance between the inner edges of the side strips 13, so that no difficulty will be experienced at this point, it being also understood that I prefer to have the emulsion surface of the film extending towards the carrying strip so as to be protected thereby it being appreciated that the application of the film to the carrying strip may be accomplished in any desirable manner such as for example by passing both of these elements through a pair of pressure rollers.

Figure 8:
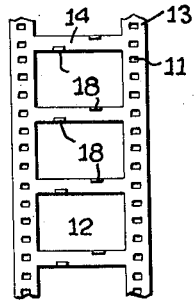
Figure 9:
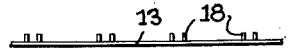

It will be understood that the carrying strip although preferably of the type shown in Figures 1 to 7 may embrace numerous modified forms of construction such as for example that type of carrying strip shown in Figures 8 and 9, in which the bars 14 in lieu of providing the tongues 15 on the same edge of each individual bar, provide tongues 18 upon opposite edges of the bar, these tongues when bent to retain the film being brought to extend towards each other i. e. towards that edge of the bar opposite to the one from which they extend.

Thus due to the reduction in the width of the film, I have found that a saving of film stock becomes apparent, and I have also found that in manufacturing material quantities of the combined strip and film, that the saving thus effected substantially offsets the expenditure involved, incident to the manufacture and application of the carrying strip to the film.

It will be understood from the foregoing that a strip of this nature is commercially practical, and will remain in permanent association with the film as long as the same is in use, and that due to the fact that the strains of feeding etc. are carried by the carrying strip, the latter serves to efficaciously prevent the film from becoming broken or from running improperly through the projecting machine, all of these factors serving to provide an article which renders a continuously operated unattended projecting machine for displaying an endless film commercially feasible in that it is virtually impossible for the film and strip carrying the same to become broken, and also for the reason that the strip will not run off the feed sprocket.

Also by providing a carrying strip in association with an unexposed film, the latter is capable of being handled with facility during the various stages incident to its being exposed, developed, etc., it being further understood as aforestated, that no amount of handling or use to which the film is subjected will result in the strip becoming detached from the film.

In this connection it is to be noted that I prefer to use film stock which has been shrunken prior to its association with the carrying strip, as the subsequent stretching or lengthening of the film during the laboratory process incident to development will be confined in such fashion as not to greatly detract from the technical effect during projection owing to the retaining quality of the tongues overlying the cross-bars and the film.

It will also be appreciated in this connection that the article as presented tends to minimize the natural tendency of film stock to shrink, due to the retentive quality of the material from which the carrying strip is made, and also when in use, owing to the fact that the film stock will not come into actual contact with the working parts of the motion picture apparatus, by reason of its association with the carrying strip, these working parts of the projecting machine will remain clean in that "scale" will not collect on the sprockets and other parts. It will further be found that by the use of this composite strip that absolute exact registration of the photographic impressions is retained in the apertures of the carrying strip throughout the life of the film strip.

Further it is to be understood from the foregoing that a specific advantage is to be predicated to the association of the carrying band with the film at points well spaced from the side edges of the latter, in that this expedient will prevent any longitudinal distortion of the film which might occur incident to shrinkage, where the film is attached to the band.

Finally I wish it expressly understood that although my invention as aforebrought out is particularly adaptable for endless projection, such as in advertising, the same may also be advantageously employed in a "reel-to-reel" film, and that numerous modifications of structure might readily be resorted to without in the least departing from the spirit of my invention as defined by the claims, which are:

1. A film, and a carrying strip including a single body, side members forming a part of said body and spaced from each other, said members being formed with perforations, the film being of a width less than the space existing between the perforations of the individual side members, and means carried by the carrying strip for permanently attaching the film to its body.

2. A carrying strip including a single body, side members spaced from each other and forming a part of said body, said members being formed with perforations, a film of a width less than the space existing between the perforations of the individual side members, and means carried by said carrying strip and engaging the film at points well spaced from the side edges for permanently associating the film and strip with one another.

3. A film and carrying strip therefor the latter including side members and cross bars extending therebetween, and tongues carried by each of said bars and adapted to engage the film to permanently attach the latter to the former.

4. A film and carrying strip therefor, the latter including side members and cross bars extending therebetween, and tongues integral with said cross-bars and extending through openings in the film and being bent for permanently associating the film with the carrying strip.

5. A film and carrying strip therefor, the latter including side members and cross bars extending therebetween, and tongues carried by said cross bars and engaging the film for permanently attaching the same to the carrying strip.

6. A film adapted to carry a series of images to be displayed in succession, a carrying strip, cross bars forming a part of the carrying strip and extending across the film at points in line with the points at which the different pictures are to abut, and means carried by the cross bars for permanently attaching the film thereto.

7. In combination a film, a carrying strip, said film being formed with openings, tongues forming a part of the carrying strip and adapted to extend through the film openings, said tongues having their outer ends bent to bear against said film whereby to permanently secure said strip and film together.

8. In combination a film, a single carrying strip, said film being formed with openings, tongues forming a part of the carrying strip and adapted to extend through the film openings, said tongues having their outer ends bent to extend against the rear surface of the said film.

9. As an article of manufacture, a picture strip, a carrying band formed with feed perforations, said strip having no feed perforations, and tongues forming a part of one of said members and extending through openings in the other for permanently uniting them.

10. As an article of manufacture, a picture strip, a carrying band formed with feed perforations, said strip having no feed perforations, and tongues forming a part of the carrying band and extending through openings in said strip in order to permanently unite these elements.

11. As an article of manufacture, a film strip, a carrying band formed with feed perforations, and tongues carried by the band at points spaced from the said feed perforations and adapted to permanently associate the film therewith.

12. An article of manufacture, including an unexposed sensitized celluloid film strip presenting an unperforated marginal portion, a metallic carrying strip with its body disposed wholly to one side thereof and providing a series of feed perforations, and means to permanently unite the two elements.

13. An article of manufacture, including a substantially conventional celluloid film strip and a carrying band therefor, said carrying band embracing side members spaced from each other, said film strip lying wholly to one side of the body of said carrying band and being of a width sufficient to completely occupy the spaces between the inner edges of the side members, and means to permanently unite the film strip and carrying band.

14. An article of manufacture, including a celluloid film strip and a carrying band having its body wholly to one side thereof, said carrying band embracing side members spaced from each other and formed with feed perforations and providing means to permanently associate the film therewith, the width of the film strip being less than the distance between said feed perforations.

15. An article of manufacture, including a metallic carrying strip, side members and fastening tongues forming a part of said strip, a conventional celluloid film strip permanently associated therewith and having its body wholly to one side thereof, said film strip being of a greater width than the space existing between the inner edges of the said side members.

16. An article of manufacture, including a carrying strip, side members and fastening tongues forming a part of said strip, a celluloid film strip disposed wholly to one side of the body thereof and in permanent association therewith, said film being of a greater width than the space existing between the inner edges of the said side members, the edges of the film terminating short of the inner edges of the feed perforations.

17. As an article of manufacture, an unexposed sensitized celluloid film strip, a carrying strip of a material stronger than said film strip, means for permanently attaching the body of said carrying strip to said film strip and wholly to one side thereof, said carrying strip having its body apertured.

18. As an article of manufacture, an unexposed sensitized celluloid film strip, a metallic carrying strip, means for permanently attaching said carrying strip to said film strip with its body wholly to one side thereof, said carrying strip having its body apertured, and cross bars forming a part of said carrying strip.

19. A carrying strip, including side portions formed with feed perforations and cross bars extending between these portions, and a celluloid film permanently and directly attached to said cross bars.

20. A carrying strip, including side portions formed with feed perforations and cross bars extending between these portions, an unexposed sensitized celluloid film strip permanently and directly attached to said cross bars, said film strip being of a width less than the distance between the different series of feed perforations.

Signed at New York in the county of New York and State of New York this 30th day of August A. D. 1922.

ARTHUR PRICE.